April 4, 1950 C. B. STARK 2,502,538
REAR SEAT WINDSHIELD
Filed June 25, 1948
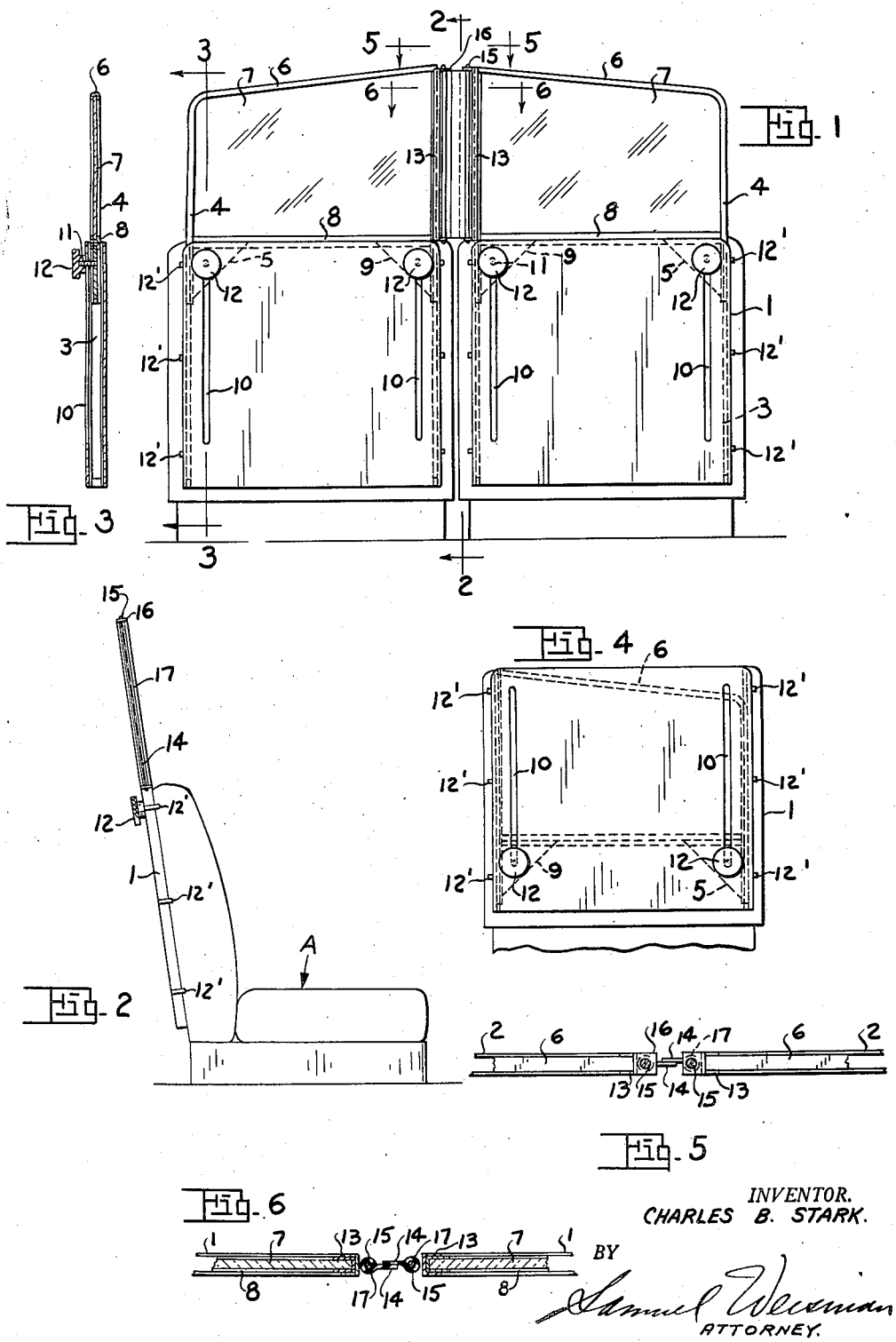
INVENTOR.
CHARLES B. STARK.
BY
Samuel Weckman
ATTORNEY.

Patented Apr. 4, 1950

2,502,538

UNITED STATES PATENT OFFICE 2,502,538

REAR SEAT WINDSHIELD

Charles B. Stark, Detroit, Mich.

Application June 25, 1948, Serial No. 35,229

4 Claims. (Cl. 296—85)

1

The present invention pertains to a novel rear seat windshield for motor vehicles, that is, a windshield that protects the occupants of the rear seats.

The current popular use of convertible passenger cars raises the problem of protecting the rear seat occupants from strong winds. The drivers of such cars find it desirable to lower the top whenever the weather permits. The front seat occupants are adequately protected by the usual windshield, and the principal object of this invention is to provide similar protection for the rear seat riders. Another object is to provide the auxiliary windshield in the form of two separate and independent units, one behind each front seat, in order to avoid an excessively wide sheet of glass which is more easily broken, to effect easier operation, and also to enable tilting either front seat forward in the case of two-door vehicles.

In the accomplishment of these objects, a narrow housing of suitable dimensions to receive a sheet of glass is attached to the back of each forward seat. The glass or shield mounted therein is set in a frame which in turn carries a pair of webs at the lower corners. In the webs are mounted clamping screws which slide in vertical slots in the housing. Thus, when the glass has been raised to the desired position, the screws are tightened to secure this adjustment.

Another object of the invention is to provide a separable seal between the two raised shields in order to permit either one to be tilted forwardly with the corresponding seat as indicated above. For this purpose a channel is slidably mounted on each of the meeting edges of the shields, and a rubber strip extends from each channel in such manner that the strips overlap each other to close the space. The flexibility of the strips permits each to be moved relatively to the other with the seat, and the seal is restored when the seat is returned to upright position.

The invention is fully disclosed by way of example in the following description and in the accompanying drawings in which:

Figure 1 is an elevation of the device in raised position;

Figure 2 is a section on the line 2—2 of Figure 1;

Figure 3 is a section on the line 3—3 of Figure 1;

Figure 4 is a partial elevation of the device in lowered position;

Figure 5 is a detail plan view on the line 5—5 of Figure 1, and

Figure 6 is a section on the line 6—6 of Figure 1.

Reference to these views will now be made by use of like characters which are employed to designate corresponding parts throughout.

In Figure 1 are shown two independent front seats A of a motor vehicle adapted to swing forward to permit access to the rear seat in the conventional two-door body. To the back of each of the seats is attached a shallow housing 1 having an open top 2 and adapted to contain a sheet of glass in a manner presently to be described. The housing contains vertical guide channels 3 along the lateral edges for receiving the sides 4 of an inverted U-shaped windshield frame, the top member 6 of which slopes upwardly toward the space between the seats A. A sheet of glass 7 is set in the frame and is retained by a moulding strip that lies substantially above the lower ends of the side members 4. Between the member 8 and the sides 4 are fastened webs 5 in the outer corners and webs 9 in the inner corners, below the mouldings 8 for a purpose that will presently appear.

The rear wall of the housing 1 is formed with a pair of vertical slots 10 near the channels 3 and extending nearly to the top of the housing. In each of the webs 5 and 9 is fixed a stud 11 extending through a slot 10 and preferably penetrating the glass 7 for bearing, as shown in Figure 3. On the rear or outer end of each stud is mounted a knurled nut 12 adapted to bear against the outer surface of the housing 1.

In the use of the device as thus far described, the glass and its frame are lifted by means of the nuts 12 which at this time are disengaged from the rear surface of the housing 1. When the frame 4—8 has been raised to the desired height, the nuts are again tightened against the housing 1.

The housing 1 may be built in or installed on the front seats at the factory in any desired manner. If applied as an accessory, the housing may carry a suitable number of fastening clips 12' which are inserted under the upholstery fabric on the back of the front seats.

There is a space of about one inch between the two frames when raised, and this space is closed by the means shown in Figure 5. A channel 13 is slidably mounted on each of the adjacent sides 4 and carries along its back a flexible strip 14 held by pins 15 that extend from lugs 16 at the ends of the channels into reinforced beads 17 on the strips. The strips overlap each other to provide a seal which readily permits each channel to swing relatively to the other with the corresponding seat, when the seat is tilted forward to permit access to the rear seat. When the seat is returned, the seal is obviously restored. The channels 13 may be removed when not in use, or the housings 1 may be modified to accommodate them.

Although a specific embodiment of the invention has been illustrated and described, it will be understood that various alterations in the details of construction may be made without departing from the scope of the invention as indicated by the appended claims.

What I claim is:

1. In a windshield construction, a housing having an open end, a windshield frame slidable in said housing and through said open end, one of the walls of said housing having a pair of slots perpendicular to said end, webs in the corners of said frame adjacent to said slots, clamping means carried by said webs and extending slidably through said slots, said means including members adapted to bind against the outer surface of said housing.

2. In a windshield construction, a housing having an open end, a windshield frame slidable in said housing and through said open end, one of the walls of said housing having a pair of slots perpendicular to said end, webs in the corners of said frame adjacent to said slots, studs carried by said webs and extending slidably through said slots, and clamping nuts on said studs and adapted to bind against the outer surface of said housing.

3. In a vehicle having a pair of forward tilting seats, a housing mounted on the back of each seat and having an open top, a windshield frame slidable in each housing and through the top thereof, means for securing said frames in elevated position in said housings, and a flexible sealing strip extending from each frame toward the other, said strips overlapping each other.

4. In a vehicle having a pair of forward tilting seats, a housing mounted on the back of each seat and having an open top, a windshield frame slidable in each housing and through the top thereof, means for securing said frames in elevated position in said housings, channels mounted on the respective trains at the meeting edges thereof, and a flexible strip extending from each channel toward the other, said strips overlapping each other.

CHARLES B. STARK.

REFERENCES CITED

The following references are of record in the file of this patent:

FOREIGN PATENTS

| Number | Country | Date |
|---|---|---|
| 2,675 | Great Britain | Oct. 9, 1871 |